Sept. 23, 1958  O. MATTHEWS  2,853,171
BALE TURNER
Filed Feb. 15, 1957
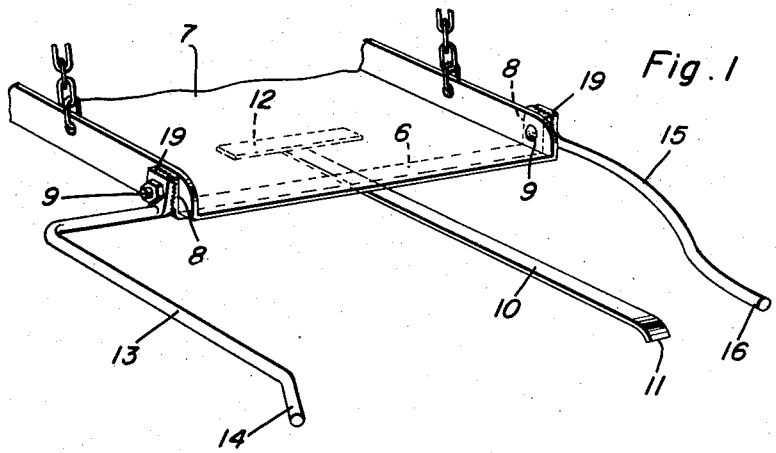
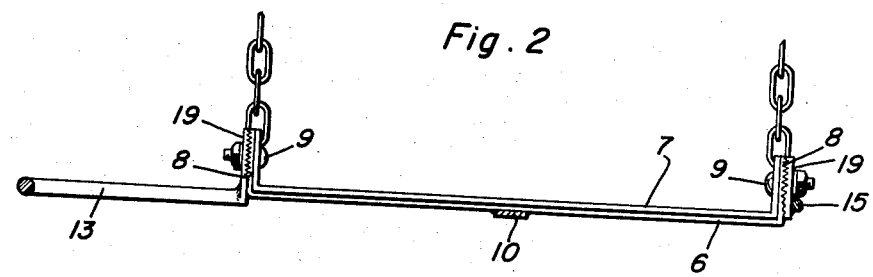
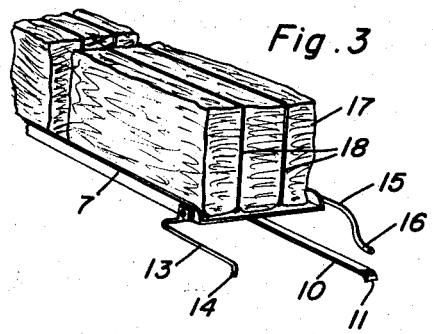
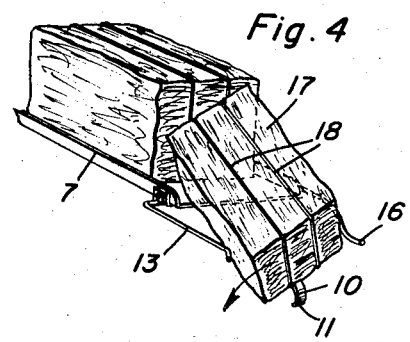
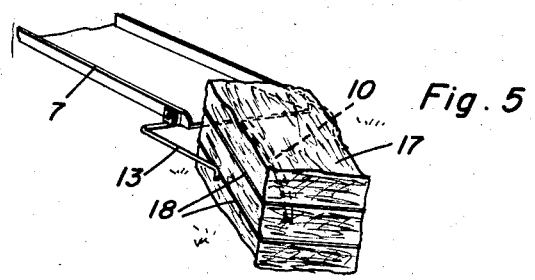
Ozias Matthews
INVENTOR.

United States Patent Office 2,853,171
Patented Sept. 23, 1958

2,853,171

BALE TURNER

Ozias Matthews, Ironside, Oreg.

Application February 15, 1957, Serial No. 640,436

3 Claims. (Cl. 193—43)

This invention relates generally to mobile or portable hay balers of the type wherein the bales are tied with heavy twine or string and deposited longitudinally on the ground with the ties on the undersides of the bales in contact with the ground where they are subject to destruction or damage by rodents, mildew, moisture, etc.

The primary object of the present invention is to provide, in a manner as hereinafter set forth, novel means for giving the bales a one-quarter turn as they are discharged from the baler chute or trough and depositing said bales carefully on the ground on one of their selvage edges and sufficiently diagonally to the line of travel to prevent rolling and overturning on hillside land.

Another very important object of the invention is to provide a bale turner of the aforementioned character which may be expeditiously attached to a conventional baler without the necessity of making material structural alterations therein.

Still another important object of the invention is to provide an attachment of the character described which may be readily installed to turn and deposit the bales either to the right or to the left of the chute to provide sufficient clearance for the equipment on a return trip when operating in heavy hay with the windrows close together.

Other objects of the invention are to provide a bale turning attachment of the character set forth which will be comparatively simple in construction, strong, durable, highly efficient and reliable in use, compact, of light weight and which may be manufactured and installed at low cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Fig. 1 is a perspective view of a bale turner embodying the present invention;

Fig. 2 is a view in transverse section through the device;

Fig. 3 is a perspective view, showing the bale about to leave the chute;

Fig. 4 is a perspective view, showing the bale leaving the chute and being turned; and, Fig. 5 is a perspective view, showing the bale after it has been deposited on the ground.

Referring now to the drawing in detail, it will be seen that the embodiment of the invention which has been illustrated comprises a substantially U-shaped mounting bar 6 of suitable metal which is secured transversely beneath the discharge end portion of a conventional baler chute or trough 7. The upturned end portions 8 of the bar 6 are rosetted and apertured to receive bolts 9 for removably securing said bar in position beneath the chute 7.

Fixed on the bar 6 at an intermediate point and projecting forwardly therefrom beyond the chute 7 is a resilient bale lowering bar 10 of suitable metal. The bar 10 terminates in a downwardly curved forward end portion 11. Fixed transversely on the rear end portion of the bar 10 is a bearing plate 12 which is engaged beneath the chute 7.

Removably secured on one of the end portions 8 of the mounting bar 6 is a laterally and then forwardly extending, angularly metallic guide rod or finger 13. The guide rod or finger 13 terminates in an outwardly laterally angled forward or free end portion 14. Removably mounted on the other end portion of the bar 6 is a rod 15 of suitable material which terminates in an inwardly curved forward or free end portion 16 which is engageable with the bale for tilting or tipping and turning said bale on the bar 10 against the guide rod 13. At the other ends thereof, the rods 13 and 15 terminate in flattened, upturned, rosetted portions 19 which are apertured to receive the bolts 9 for pivotally mounting said rods on the complemental end portions 8 of the bar 6 for vertical swinging adjustment.

It is thought that the operation of the device will be readily apparent from a consideration of the foregoing. Briefly, the assembly is secured on the discharge end portion of the baler chute 7 in the manner hown to advantage in Fig. 1 of the drawing. In Figs. 3, 4 and 5 of the drawing, reference character 17 designates a bale of hay on the chute 7. The bale 17, in the usual position, is forced from the chute 7 and slides along the resilient bar 10 by which one end of said bale is gently lowered to the ground. As the bale 17 is thus lowered it engages the inwardly curved end portion 16 of the rod 15 and is tilted and turned thereby on the bar 10 against the rod 13. This is shown in Figure 4 of the drawing. As the baler moves forwardly the bale 17, with one end now resting on the ground, is turned sufficiently to bring one of the selvage edges lowermost, on which edge the bale is deposited. The construction and arrangement of parts also is such as to deposit the bales diagonally to the line of travel in a manner to prevent rolling and overturning on hillside land. This is shown in Fig. 5 of the drawing. With the bales 17 thus deposited, it will be observed that the ties 18 thereof are out of contact with the ground. This also facilitates picking up the bales through the medium of a hydraloader without breaking the ties. Still further, when the bales are deposited on one of their selvage edges circulation of air therebeneath is promoted for proper curing and the prevention of mold. By interchanging or reversing the members 13 and 15 the bales may be deposited either to the right or to the left of the chute 7.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A mobile baler comprising a discharge chute for depositing the bales on the ground, a member mounted transversely beneath the chute, a resilient bar mounted at an intermediate point on said member and projecting forwardly therefrom beyond the discharge end of the chute, a guide rod removably mounted on one portion of said member and substantially paralleling the bar, and a tilting rod removably mounted on the other end portion of said member and engageable with the bale for tilting same on said bar against the said guide rod, said member, bar and rods being stationary relative to the chute.

2. A mobile baler comprising a discharge chute for depositing the bales on the ground, a substantially U-shaped member mounted transversely beneath the chute, a resilient bar affixed at an intermediate point to said member and projecting forwardly therefrom beyond the discharge end of the chute for receiving the bales therefrom and lowering said bales to the ground, a bearing plate on the rear end of said bar engaged beneath the chute, and a rod on one end of the member for tilting the bales on said bar.

3. An attachment for mobile balers including a bale discharge chute, said attachment comprising: a bar mounted transversely beneath the discharge end portion of the chute and including upturned end portions, a resilient bar mounted on an intermediate portion of the transverse bar and projecting longitudinally beyond the discharge end of the chute for receiving the bales therefrom and lowering said bales to the ground, a guide rod for the bales pivotally mounted for vertical swinging adjustment on one of said end portions of the transverse bar, and a rod pivotally mounted for vertical swinging adjustment on the other of said end portions of said transverse bar and engageable with the bales for tilting and turning same on said longitudinal bar against said guide rod.

References Cited in the file of this patent
UNITED STATES PATENTS 2,740,250  Olson et al. _____ Apr. 3, 1956